(12) United States Patent
Kurosawa

(10) Patent No.: US 9,824,821 B2
(45) Date of Patent: Nov. 21, 2017

(54) THIN FILM CAPACITOR WITH INTERMEDIATE ELECTRODES

(71) Applicant: TAIYO YUDEN CO., LTD., Tokyo (JP)

(72) Inventor: Masaru Kurosawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 7 days.

(21) Appl. No.: 14/821,444

(22) Filed: Aug. 7, 2015

(65) Prior Publication Data

US 2016/0071651 A1    Mar. 10, 2016

(30) Foreign Application Priority Data

Sep. 5, 2014  (JP) ................................ 2014-181357

(51) Int. Cl.
| | | |
|---|---|---|
| *H01G 4/228* | (2006.01) | |
| *H01G 4/30* | (2006.01) | |
| *H01G 4/38* | (2006.01) | |
| *H01G 4/224* | (2006.01) | |

(52) U.S. Cl.
CPC ............. *H01G 4/228* (2013.01); *H01G 4/306* (2013.01); *H01G 4/224* (2013.01); *H01G 4/38* (2013.01)

(58) Field of Classification Search
CPC ........ H01G 4/228; H01G 4/306; H01G 4/224; H01G 4/38
See application file for complete search history.

(56) References Cited

U.S. PATENT DOCUMENTS

| | | | | |
|---|---|---|---|---|
| 2,398,176 | A * | 4/1946 | Deyrup ................. | H01G 4/228 174/50 |
| 5,774,326 | A * | 6/1998 | McConnelee ........ | H01G 4/2325 361/306.1 |
| 5,875,531 | A * | 3/1999 | Nellissen ............... | H01G 4/306 29/25.35 |
| 6,226,170 | B1* | 5/2001 | Nellissen ................ | H01G 4/08 361/302 |
| 6,236,102 | B1* | 5/2001 | Kim ........................ | H01G 4/06 257/532 |
| 6,998,308 | B2* | 2/2006 | Ooi ..................... | H01L 21/6835 257/E21.503 |

(Continued)

FOREIGN PATENT DOCUMENTS

| | | | |
|---|---|---|---|
| JP | 03050709 | A * | 3/1991 |
| JP | 04360507 | A * | 12/1992 |

(Continued)

*Primary Examiner* — David M Sinclair
(74) *Attorney, Agent, or Firm* — Chen Yoshimura LLP

(57) ABSTRACT

A thin film capacitor includes: a supporting substrate; a capacitance forming member formed on the supporting substrate and made of at least two thin film electrodes and at least one thin film dielectric layer alternately stacked on one another; intermediate electrodes electrically connected to the respective thin film electrodes; a sealing member that seals the capacitance forming member and the intermediate electrodes on the supporting substrate the sealing member leaving portions of the intermediate electrodes exposed; and external electrodes formed on at least side faces of the sealing member and respectively connected to the exposed portions of the intermediate electrodes.

9 Claims, 10 Drawing Sheets

(56) References Cited

U.S. PATENT DOCUMENTS

| | | | |
|---|---|---|---|
| 2004/0104451 A1* | 6/2004 | Ooi | H01G 4/224 |
| | | | 257/532 |
| 2004/0130849 A1 | 7/2004 | Kurihara et al. | |
| 2009/0141426 A1* | 6/2009 | Hwang | H01G 4/012 |
| | | | 361/321.2 |
| 2009/0244808 A1* | 10/2009 | Ohtsuka | H01G 4/33 |
| | | | 361/311 |
| 2013/0258545 A1* | 10/2013 | Yano | H01G 4/306 |
| | | | 361/301.4 |
| 2015/0103465 A1* | 4/2015 | Kang | H01G 4/1227 |
| | | | 361/301.4 |

FOREIGN PATENT DOCUMENTS

| | | | |
|---|---|---|---|
| JP | 05121262 A | * | 5/1993 |
| JP | 2004-214589 A | | 7/2004 |

\* cited by examiner

THIN FILM CAPACITOR WITH INTERMEDIATE ELECTRODES

BACKGROUND OF THE INVENTION

Technical Field

The present invention relates to a thin film capacitor having a capacitance forming member where thin film electrodes and thin film dielectrics have been alternately stacked on one another on a supporting substrate in a thin film manufacturing process.

Background Art

Recent demand has been focused on thin film capacitors having a MIM (metal-insulator-metal) capacitance generating section formed on a supporting substrate by a thin film manufacturing process, in order for the capacitor, which is an electronic component, to have a lower profile. Structures are being researched for this type of thin film capacitor in which a large number of thin film electrodes and thin film dielectrics are stacked on one another in the capacitance generating section in order to obtain a high capacitance.

A thin film capacitor having a pyramid structure in which the ends of the capacitance generating section are stepped from bottom (supporting substrate direction) to top is known as one type of the abovementioned structure. This pyramid-structured capacitance generating section is manufactured by collectively forming the thin film electrodes and thin film dielectrics alternately; etching from the top layer downwards; and the like. In this type of structure, however, the intersection area of the thin film electrodes is reduced, which lowers capacitance density.

In order to solve this type of issue, it has been proposed to only pattern the thin film electrodes, and not the thin film dielectrics, thereby forming a thin film capacitor that has a structure similar to that of an MLCC (multi-layer ceramic capacitor).

When manufacturing a thin film capacitor with a structure similar to that of an MLCC, it is important to connect electrically in a robust manner the respective thin film electrodes and external electrodes. A conventional proposal concerning this method is to use dicing to expose the respective ends of the stacked thin film electrodes and to make these electrodes directly connect with the external electrodes (see Patent Document 1, for example).

RELATED ART DOCUMENT

Patent Document

Patent Document 1: Japanese Patent Application Laid-Open Publication No. 2004-214589

SUMMARY OF THE INVENTION

The problems with this method, however, are that mechanical damage and marked characteristic degradation occur to the thin film electrodes that have been exposed by dicing and the surrounding thin film dielectrics. In addition to shorting caused by structural damage, capacitance loss due to unreliable electrical connection between the thin film electrodes and external electrodes and steep variation in the reliability of the devices are also problematic. As a specific example, in a five-layer capacitor, short-circuit failures occur approximately 40% of the time, and approximately 30% of the devices have capacitance loss. Furthermore, high temperature bias tests on these same devices showed that the inclination of the Weibull distribution was small and that there was considerable variation in reliability among the devices.

The present invention was designed in consideration of the above-mentioned issues, and in at least one aspect, aims at providing a thin film capacitor that can have higher reliability and increased capacitance. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a thin film capacitor, including: a supporting substrate; a capacitance forming member formed on the supporting substrate and made of at least two thin film electrodes and at least one thin film dielectric alternately stacked on one another; intermediate electrodes electrically connected to the respective thin film electrodes; a sealing member that seals the capacitance forming member and the intermediate electrodes on the supporting substrate, the sealing member leaving portions of the intermediate electrodes exposed; and external electrodes formed on at least side faces of the sealing member and respectively connected to the exposed portions of the intermediate electrodes.

According to at least one aspect of the present invention, the external electrodes are not directly connected to the thin film electrodes, but rather are connected through intermediate electrodes. This makes it unnecessary to use mechanical dicing to expose the thin film electrodes in the capacitance forming member. Therefore, it is possible for no mechanical damage to occur when exposing the thin film electrodes in the capacitance forming member. This allows for the reliability and capacitance of the device to be increased.

In another aspect, the present disclosure provides the abovementioned thin film capacitor, wherein the capacitance forming member has a generally block shape having depressions formed on respective sides thereof, the depressions exposing edges of the thin film electrodes, and wherein the intermediate electrodes are formed inside the depressions, respectively, to make electrical connections with the exposed edges of the thin film electrodes.

In another aspect, the present disclosure provides the abovementioned thin film capacitor, wherein the thin film electrodes are exposed at edges of the capacitance forming member, and the intermediate electrodes are connected to the exposed thin film electrodes.

In another aspect, the present disclosure provides the abovementioned thin film capacitor, wherein the sealing member is formed so as to expose edges of the respective intermediate electrodes, and wherein the external electrodes are electrically connected to the exposed edges of the respective intermediate electrodes.

In another aspect, the present disclosure provides the abovementioned thin film capacitor, wherein the sealing member is formed so as to expose top surfaces of the respective intermediate electrodes on the supporting substrate, and wherein the external electrodes are electrically connected to the exposed top surfaces of the respective intermediate electrodes on the supporting substrate.

In another aspect, the present disclosure provides a thin film capacitor module including a plurality of the thin film capacitor as set forth above stacked on one another, wherein the external electrodes of the plurality of the thin film capacitor as set forth above are integrated to provide respective unitary external electrodes.

In another aspect, the present disclosure provides the abovementioned thin film capacitor, wherein at least portions of the respective intermediate electrodes are formed on a top surface of the capacitance forming member, and wherein the intermediate electrodes are not formed on an area on the top surface of the capacitance forming member where the thin film electrodes overlap one another in a plan view.

In at least one aspect, the present invention makes it possible for no mechanical damage to occur when exposing the thin film electrodes in the capacitance forming member, thereby allowing for the reliability and the capacitance of the device to be enhanced.

It is to be understood that both the foregoing general description and the following detailed description are exemplary and explanatory, and are intended to provide further explanation of the invention as claimed.

DETAILED DESCRIPTION OF EMBODIMENTS

Embodiment 1

Figure 1:
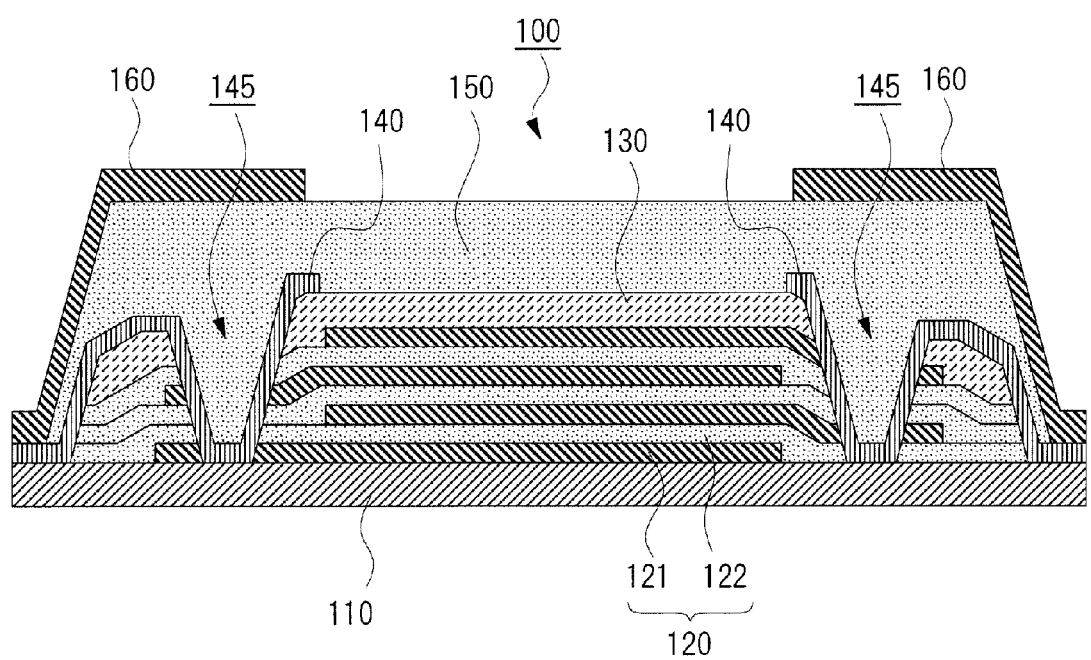
FIG. 1 is a cross-sectional view of a thin film capacitor of Embodiment 1.

A thin film capacitor according to embodiments of the present invention will be explained below with reference to the drawings. FIG. 1 is a cross-sectional view of a thin film capacitor of Embodiment 1. It should be noted that these various figures are schematic representations used for convenience to describe the invention and are not shown to scale.

As shown in FIG. 1, a thin film capacitor 100 includes: a supporting substrate 110; a capacitance forming member 120 formed on the supporting substrate 110 and constituted by thin film electrode layers 121 and thin film dielectric layers 122 alternately stacked on one another; a protective layer 130 formed on top of the capacitance forming member 120 for protecting the uppermost thin film electrode layer 121; a pair of intermediate electrodes 140 electrically connected to the thin film electrode layers 121; a sealing member 150 that seals the capacitance forming member 120, protective layer 130, and intermediate electrodes 140; and a pair of external electrodes 160 that each electrically connect to the corresponding intermediate electrode 140.

The supporting substrate 110 can be formed from an insulating inorganic material such as quartz, alumina, sapphire, and glass, or from a conductive inorganic material such as Si, for example. It is preferable that an insulating layer be formed on the supporting substrate 110 when a conductive supporting substrate is used as the supporting substrate 110. It is also preferable that an adhesive layer be formed on the supporting substrate 110 to improve adhesion with the thin film electrode layer 121. Alternatively, the supporting substrate 110 may be formed of an organic material such as a resin film, for example. The handling of thin films, however, is difficult, and thus the resin film may be temporarily bonded to a smooth supporting substrate made of Si or the like.

The capacitance forming member 120, which is constituted by at least two thin film electrode layers 121 and at least one thin film dielectric layer 122, is a so-called MIM (metal-insulator-metal) structure.

The thin film electrode layers 121 each have a differing pattern from one another, and are respectively electrically connected to a different one of the intermediate electrodes 140 every other layer. The thin film electrode layers 121 may be formed of various types of conductive materials, such as metals including Cu, Ni, Pt, Al, Ti, Ir, Ru, or conductive oxides including $RuO_2$ and $IrO_2$, for example. The thin film electrode layers 121 can be formed by sputtering, CVD (chemical vapor deposition), evaporation, ALD (atomic layer deposition), and the like, or any film forming method that does not damage or alter the supporting substrate 110.

It is preferable that the thin film dielectric layers 122 be oxides such as $(Ba,Sr)TiO_3$ (BST), $SrTiO_3$ (STO), $TiO_2$, $ZrO_2$, $HfO_2$, or the like. It is possible to use the same film forming method for the thin film dielectric layers 122 as the thin film electrode layers 121, or any film forming method that does not damage or alter the supporting substrate 110.

The protective layer 130 can be formed from an inorganic material such as $Al_2O_3$, $SiO_2$, $Si_3N_4$, BST, or an organic resin such as polyimide. It should be noted that the protective layer 130 may be formed of either only a single material or a combination of two or more types of materials.

Depressions 145 for forming the respective intermediate electrodes 140 are provided in the multilayer structure constituted by the capacitance forming member 120 made of the thin film electrode layers 121 and the thin film dielectric layers 122 and the protective layer 130 on top of the capacitance forming member 120. The depressions 145 are formed in positions where every other of the respective thin film dielectric layers 122 is exposed therein. The depressions 145 are formed simultaneously with the external shape of the capacitance forming member 120 and the protective layer 130. This depression forming step includes forming a pattern with resist and using a dry process such as RIE (reactive ion etching) or ion milling to remove the multilayer structure.

The intermediate electrodes 140 are formed from the top and the sides of the multilayer structure constituted by the capacitance forming member 120 and the protective layer 130 to the top of the supporting substrate 110. The intermediate electrodes 140 are also formed in the depressions 145. This electrically connects every other of the thin film electrode layers 121 to the respective intermediate electrodes. In this example, it should be noted that the intermediate electrodes 140 are not formed in the intersection areas of the thin film electrode layers 121 in the capacitance forming member 120, or namely, the overlapping areas of the thin film electrode layers 121 when the thin film electrode layers 121 are transparently superimposed on each other in the thickness direction. The intermediate electrodes 140 can be formed of the same type of metal as the thin film electrodes 121, but it preferable that a metal having barrier properties such as Ti or Ni be used. The intermediate electrodes 140 are formed with the same method as the thin film electrode layers 121, but the present invention is not limited to this method.

The sealing member 150 is formed to cover the intermediate electrodes 140 and the multilayer structure constituted by the capacitance forming member 120 and the protective layer 130, and such that the top of the sealing member 150 is flat. The sealing member 150, however, is formed to expose a portion of the intermediate electrodes 140 provided on the supporting substrate 110. The sealing member 150 is made of a resin such as polyimide. It is preferable that the sealing member 150 have the same type and thickness as the resin used for the supporting substrate 110, but the sealing member is not limited to this type. The sealing member 150 fills in the depressions 145. Accordingly, it is preferable that the sealing member 150 be formed at a thickness sufficient to fill the depressions 145 and have a flat surface.

The external electrodes 160 are formed by sputtering, electron beam evaporation, thin coating, or the like of several types of materials, such as Ti/Cu/Ni/Sn, for example. At such time, the external electrodes 160 are electrically connected to the intermediate electrodes 140 exposed on top of the supporting substrate 110.

Next, a method of manufacturing the thin film capacitor 100 according to the present embodiment will be explained with reference to FIGS. 2A to 2F and FIGS. 3G to 3J. FIGS. 2A to 2F and FIGS. 3G to 3J show manufacturing steps of the thin film capacitor.

Figure 2A:
FIGS. 2A to 2F are views of manufacturing steps of Embodiment 1.
Figure 2B:
Figure 2C:
Figure 2D:
Figure 2E:
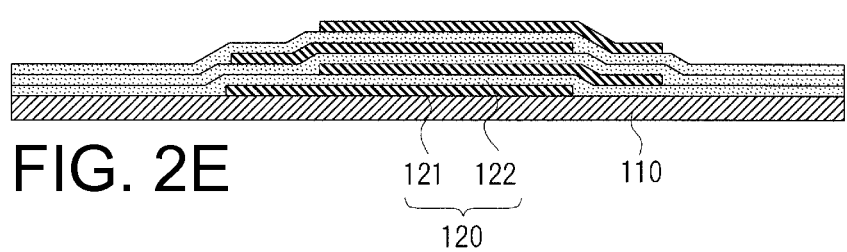

First, the supporting substrate 110 is prepared (FIG. 2A), and the MIM structure capacitance forming member 120 is formed on the supporting substrate 110. Specifically, sputtering or the like is used to form the thin film electrode layer 121 over the entire supporting substrate 110 (FIG. 2B). Next, a resist mask is formed using photolithography, and then dry etching such as reactive ion etching is used to pattern the thin film electrode layer 121 into a prescribed shape (FIG. 2C). Sputtering or the like is then used to form the dielectric thin film layer 122 on the thin film electrode layer 121 (FIG. 2D). The above steps are repeated a prescribed number of times. The patterns of the thin film electrode layers 121, however, alternate every other layer. This forms the capacitance forming member 120 constituted by the thin film electrode layers 121 and the thin film dielectric layers 122 being stacked on one another (FIG. 2E). It should be noted that the uppermost layer of the capacitance forming member 120 one of the thin film electrode layers 121. Furthermore, the thin film electrode layers 121 are patterned in prescribed shapes, and thus the capacitance forming member 120 constituted by the thin film electrode layers 121 and the thin film dielectric layers 122 stacked on one another gradually thins from the center to the edges.

Figure 2F:
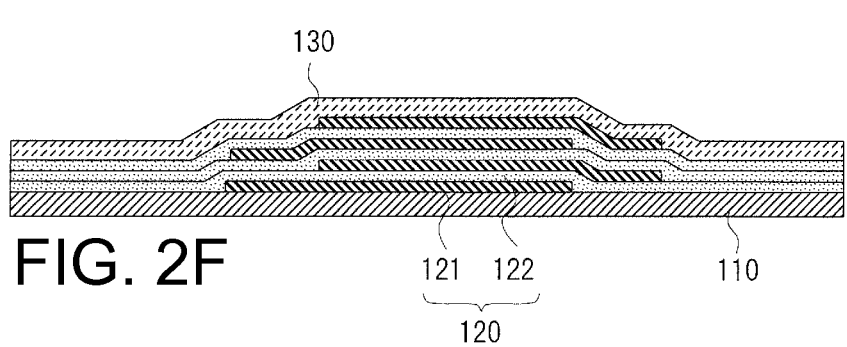

Next, sputtering or the like is used to form the protective layer 130 over the entire top of the capacitance forming member 120 (FIG. 2F).

Figure 3G:
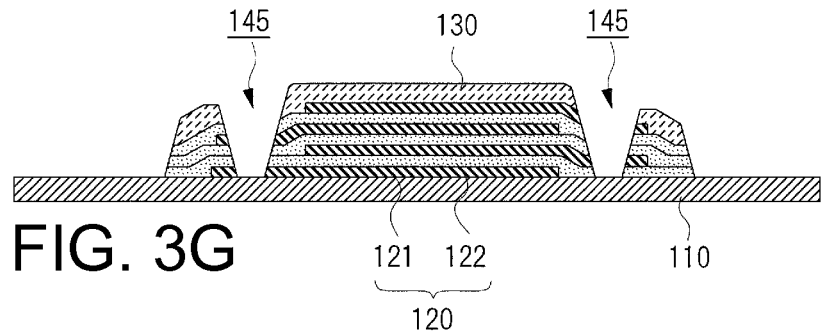
FIGS. 3G to 3J are views of manufacturing steps of Embodiment 1.

Portions of the capacitance forming member 120 and the protective layer 130 are then removed such that the multilayer structure constituted by the capacitance forming member 120 and the protective layer 130 assumes a prescribed outer shape and such that the depressions 145 are formed in prescribed locations (FIG. 3G). This removal includes forming a resist having a prescribed pattern by photolithography or the like and removing portions of the multilayer structure by dry etching. It is preferable that the resist be tapered. This step exposes the top of the supporting substrate 110 at the sides of the capacitance forming member 120 and form the depressions 145 in prescribed locations. It should be noted that the bottom of the depressions 145 is the top of the supporting substrate 110 and is tapered due to the tapered resist. Moreover, the thin film electrode layers 121 are alternately exposed to the inside of the respective depressions 145.

Figure 3H:
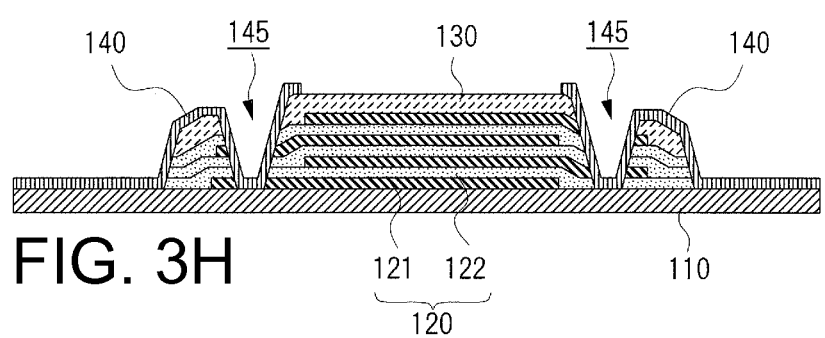

Next, sputtering or the like is used to form the intermediate electrodes 140 from the top and the sides of the multilayer structure constituted by the capacitance forming member 120 and the protective layer 130 to the top of the supporting substrate 110 (FIG. 3H). At such time, the intermediate electrodes 140 are also formed in the depressions 145.

Figure 3I:
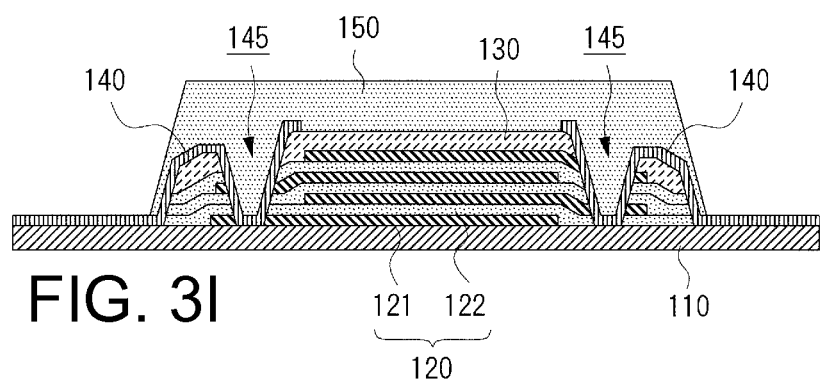

The sealing member 150 is then formed to seal the intermediate electrodes 140 and the multilayer structure constituted by the capacitance forming member 120 and the protective layer 130 (FIG. 3I). In this example, the sealing member 150 has a flat top, and is formed such that the intermediate electrodes 140 on the supporting substrate 110 are exposed at the sides of the capacitance forming member 120. The sealing member 150 is also filled into the depressions 145 in this step.

Figure 3J:
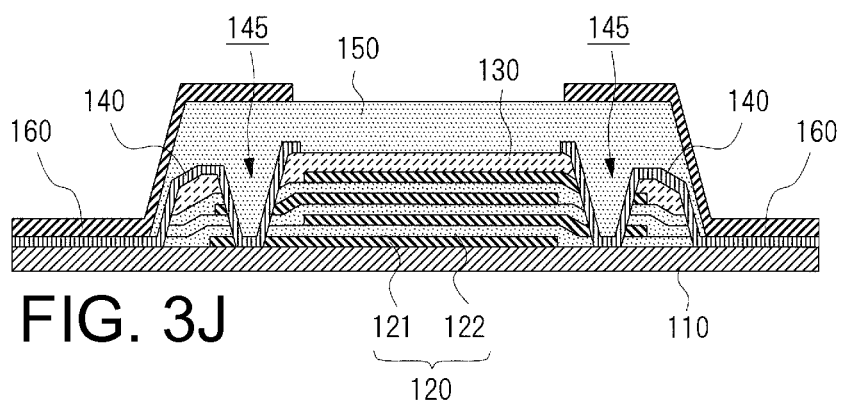

Next, sputtering or the like is used to form the external electrodes 160 from the top and sides of the sealing member 150 to the intermediate electrodes 140 on the supporting substrate 110 (FIG. 3J).

Finally, dicing prescribed locations on the sides of the sealing member 150 results in the thin film capacitor 100 of a prescribed size.

In this type of thin film capacitor 100, the area where the depressions 145 are formed, or rather, the areas connecting the thin film electrode layers 121 and the intermediate electrodes 140, differ from the dicing areas that form the component size. Accordingly, the process to form the depressions 145 is a different process from the one to perform dicing; therefore, in the process to form the depressions 145, a dry process or the like can be used instead of a mechanical dicing process. Meanwhile, in the dicing process to form the component size, the thin film dielectric layers 122 are not cut. This can lessen mechanical damage, thereby allowing for the reliability and capacitance of the device to be enhanced.

Embodiment 2

Figure 4:
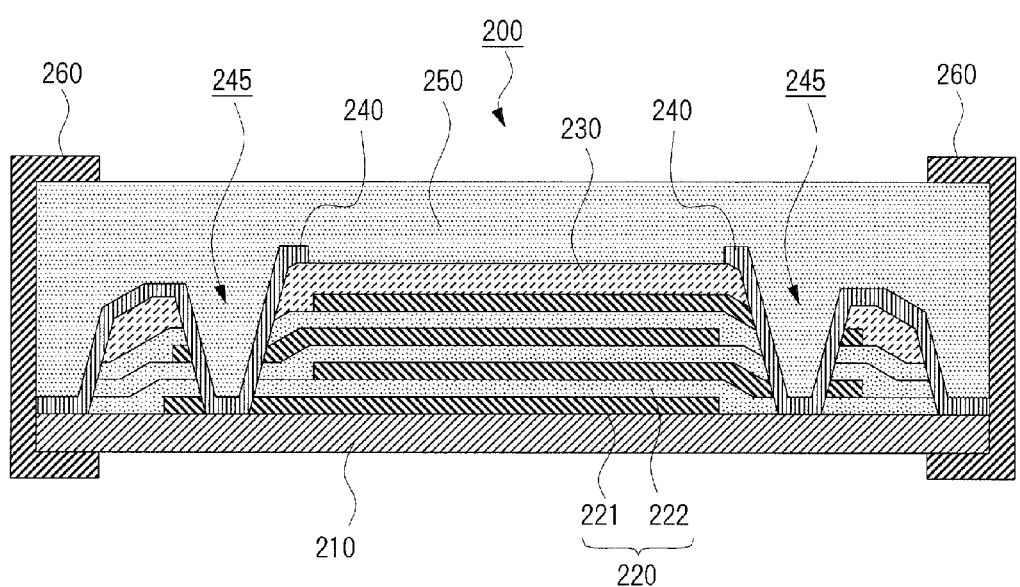
FIG. 4 is a cross-sectional view of a thin film capacitor of Embodiment 2.

A thin film capacitor according to Embodiment 2 of the present invention will be explained with reference to FIG. 4. FIG. 4 is a cross-sectional view of the thin film capacitor according to Embodiment 2. Embodiment 2 differs from Embodiment 1 in how the external electrodes are connected to the intermediate electrodes. Other features are similar to Embodiment 1, and thus only the differences will be explained.

The thin film capacitor 200 of the present embodiment includes: a supporting substrate 210; a capacitance forming member 220 on the supporting substrate 210 and constituted by thin film electrode layers 221 and thin film dielectric layers 222 alternately stacked on one another; a protective layer 230 formed on top of the capacitance forming member 220 for protecting the uppermost thin film electrode layer 221; a pair of intermediate electrodes 240 electrically connected to the thin film electrode layers 221; a sealing member 250 that seals the capacitance forming member 220, protective layer 230, and intermediate electrodes 240; and a pair of external electrodes 260 that each electrically connect to the corresponding intermediate electrode 240.

The thin film capacitor 200 of the present embodiment differs from Embodiment 1 in that the intermediate electrodes 240 are only exposed to the sides of the sealing member 250 and connect with the external electrodes 260 at the sides of the sealing member 250. The external electrodes 260 are formed from the sides of the sealing member 250 to the top and the bottom abutting these sides. Any method or material can be used to form the external electrodes 260. In a similar manner to a conventional MLCC, a dip method or the like is used to coat a conductive paste onto the sides of the sealing member 250, and then the member is baked at a prescribed temperature and Cu, Ni, Sn, or the like is thin coated on the surface, thereby forming the external electrodes 260. Another method is to use sputtering, electron beam evaporation, thin coating, or the like of several types of materials such as Ti/Cu/Ni/Sn, for example.

A method of manufacturing the thin film capacitor of the present embodiment will be described with reference to FIGS. 5I to 5J. The steps up until forming the protective layer 230, depressions 245, intermediate electrodes 240, and the capacitance forming member 220 constituted by the thin film electrode layers 221 and the thin film dielectric layers 222 alternately stacked on one another are the same as in Embodiment 1 (see FIGS. 2A to 2F and FIGS. 3G to 3H).

Figure 5I:
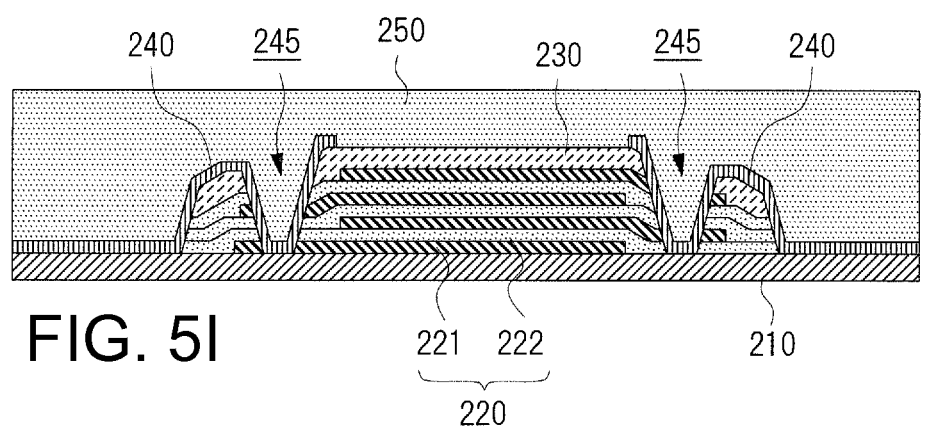
FIGS. 5I to 5J are views of manufacturing steps of Embodiment 2.

Next, the sealing member 250 is formed to cover the intermediate electrodes 240 and the multilayer structure constituted by the capacitance forming member 220 and the protective layer 230 (FIG. 5I). The sealing member 250 is formed such that the entire top thereof is flat. The depressions 245 are also filled by the sealing member 250 in this step.

Figure 5J:
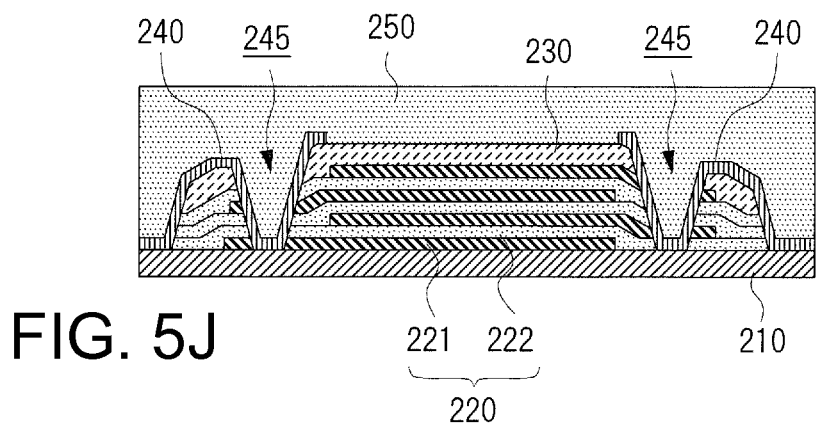

Next, prescribed locations are diced such that the intermediate electrodes 240 are exposed to the sides of the sealing member 250 (FIG. 5J).

Finally, the external electrodes 260 are formed on the sides of the sealing member 250 so as to electrically connect to the intermediate electrodes 240, thereby resulting in the thin film capacitor 200.

The thin film capacitor 200 of the present embodiment can obtain similar effects to Embodiment 1.

Embodiment 3

Figure 6:
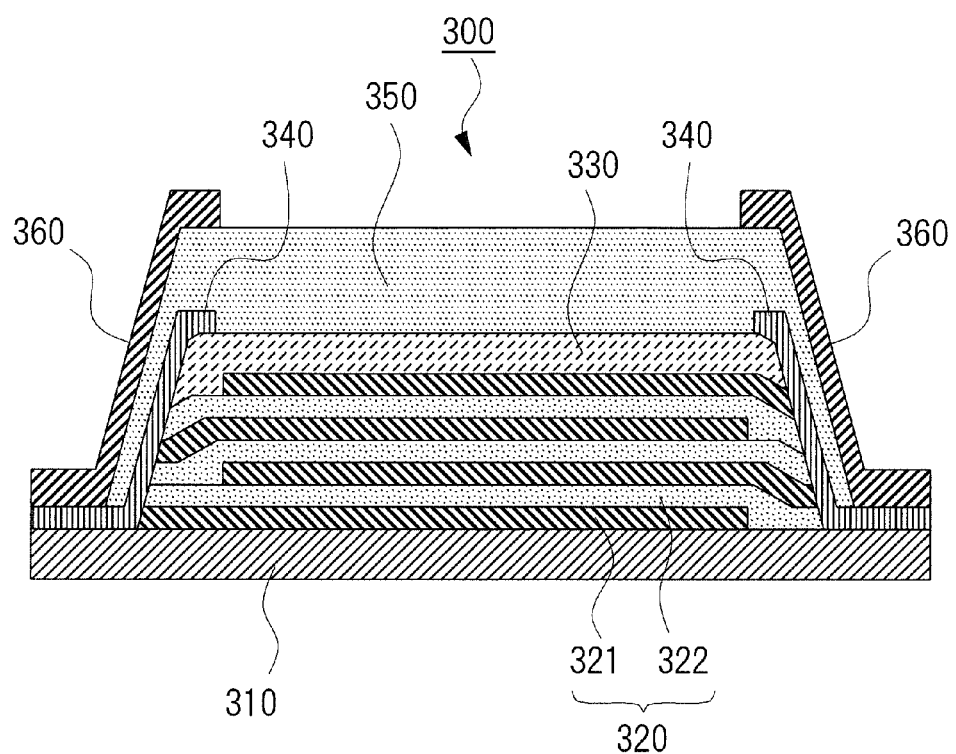
FIG. 6 is a cross-sectional view of a thin film capacitor of Embodiment 3.

A thin film capacitor according to Embodiment 3 of the present invention will be explained with reference to FIG. 6. FIG. 6 is a cross-sectional view of a thin film capacitor of Embodiment 3. Embodiment 3 differs from Embodiment 1 in how the intermediate electrodes are connected to the thin film electrode layers. Other features are similar to Embodiment 1, and thus only the differences will be explained.

The thin film capacitor 300 of the present embodiment includes: a supporting substrate 310; a capacitance forming member 320 on the supporting substrate 310 and constituted by thin film electrode layers 321 and thin film dielectric layers 322 alternately stacked on one another; a protective layer 330 formed on top of the capacitance forming member 320 for protecting the uppermost thin film electrode layer 321; a pair of intermediate electrodes 340 electrically connected to the thin film electrode layers 321; a sealing member 350 that seals the capacitance forming member 320, protective layer 330, and intermediate electrodes 340; and a pair of external electrodes 360 that each electrically connect to the corresponding intermediate electrode 340.

The thin film capacitor 300 of the present embodiment differs from Embodiment 1 in that the thin film electrode layers 321 and intermediate electrodes 340 connect at the sides of the capacitance forming member 320. Accordingly, unlike in Embodiment 1, there are no depressions formed in the multilayer structure constituted by the capacitance forming member 320 and the protective layer 330.

A method of manufacturing the thin film capacitor of the present embodiment will be explained with reference to FIGS. 7G to 7J. The steps up to forming the protective layer 330 and the capacitance forming member 320 constituted by the thin film electrode layers 321 and the thin film dielectric layers 322 being alternately stacked on one another is the same as in Embodiment 1 (see FIGS. 2A to 2F).

Figure 7G:
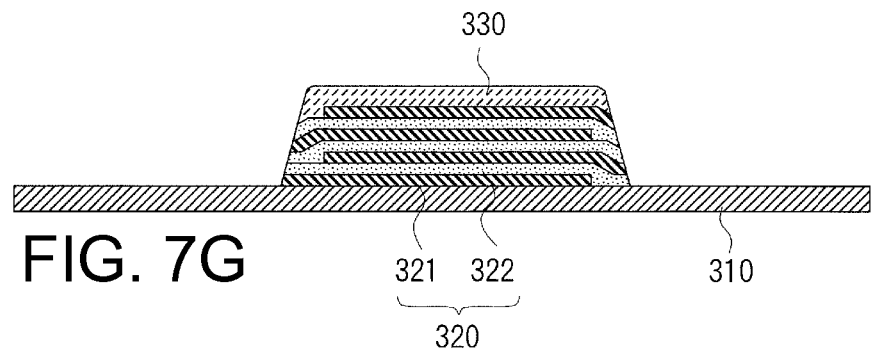
FIGS. 7G to 7J are views of manufacturing steps of Embodiment 3.

Next, portions of the capacitance forming member 320 and the protective layer 330 are removed such that the multilayer structure constituted by the capacitance forming member 320 and the protective layer 330 assumes a prescribed outer shape (FIG. 7G). This removal includes forming a resist having a prescribed pattern through photolithography or the like and removing a portion of the multilayer structure through dry etching. This exposes the top of the supporting substrate 310 at the sides of the capacitance forming member 320.

Figure 7H:
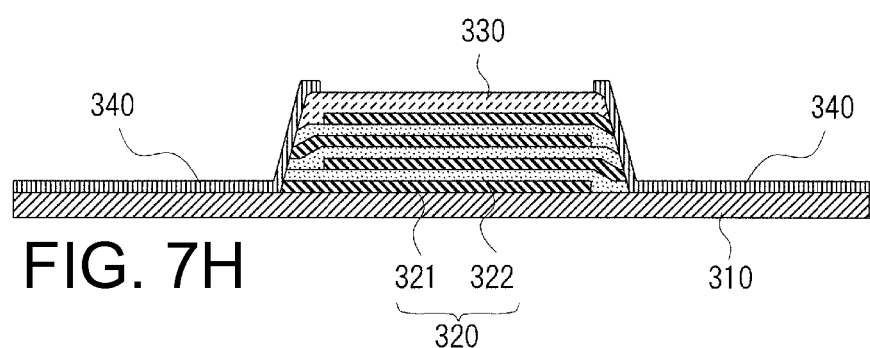

Next, sputtering or the like is used form the intermediate electrodes 340 from the top and the sides of them multilayer structure constituted by the capacitance forming member 320 and the protective layer 330 to the top of the supporting substrate 310 (FIG. 7H).

Figure 7I:
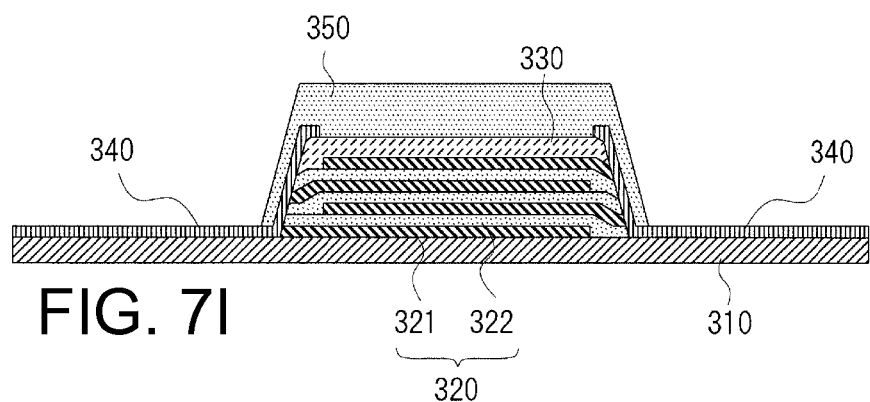

Next, a sealing member 350 is formed to seal the intermediate electrodes 340 and the multilayer structure constituted by the capacitance forming member 320 and the protective layer 330 (FIG. 7I). In this example, the sealing member 350 has a flat top surface, and the intermediate electrodes 340 on the supporting substrate 310 are exposed at the portions of the sealing member 350 on the sides of the capacitance forming member 320.

Figure 7J:
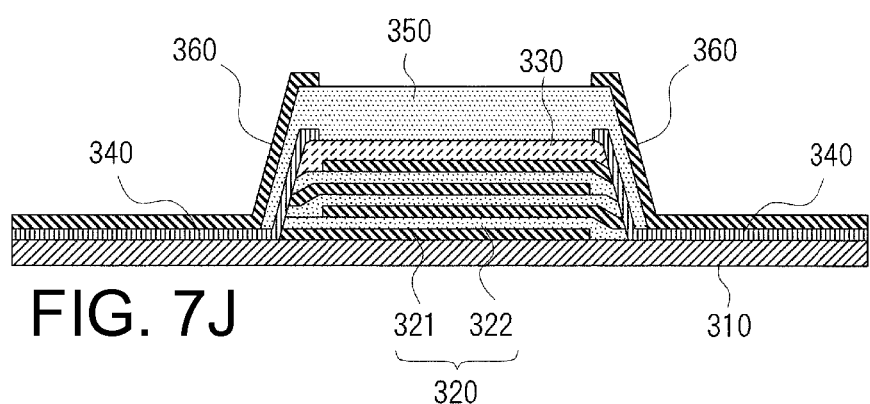

Sputtering or the like is then used to form the external electrodes 360 from the top and sides of the sealing member 350 to the intermediate electrodes 340 on the supporting substrate 310 (FIG. 7J).

Finally, prescribed locations at the sides of the sealing member 350 are diced, resulting in the thin film capacitor 300 of a prescribed size.

The thin film capacitor 300 of the present embodiment can obtain similar effects to Embodiment 1.

Embodiment 4

Figure 8:
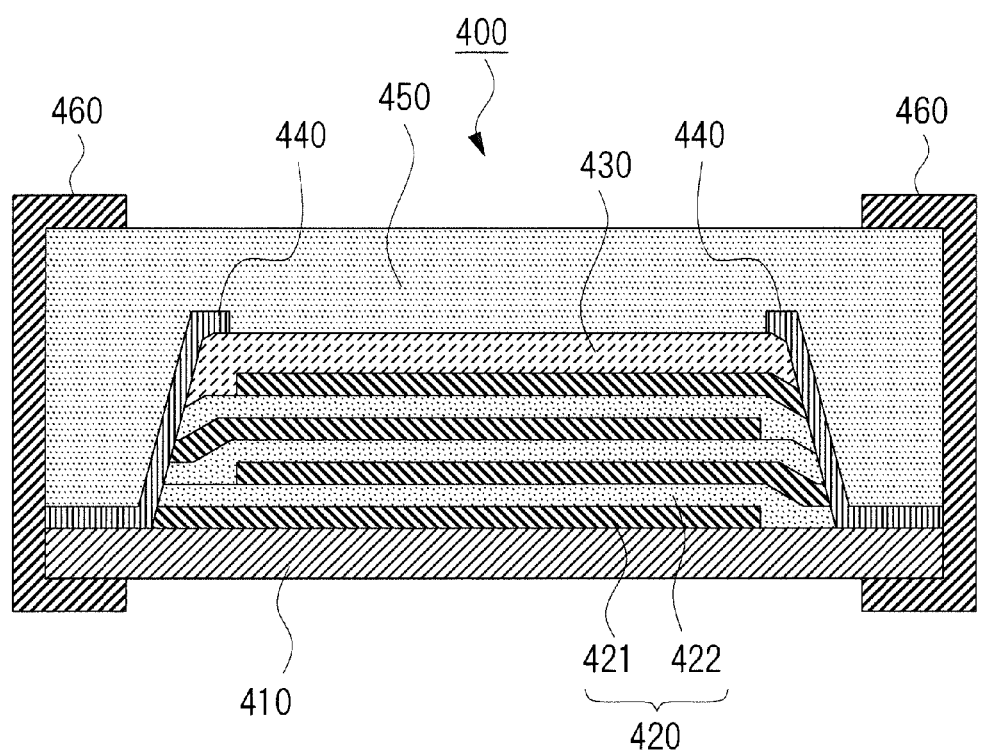
FIG. 8 is a cross-sectional view of a thin film capacitor of Embodiment 4.

A thin film capacitor according to Embodiment 4 of the present invention will be explained with reference to FIG. 8. FIG. 8 is a cross-sectional view of a thin film capacitor of Embodiment 4. Embodiment 4 differs from Embodiment 1 in how the external electrodes and intermediate electrodes are connected to one another and how the intermediate electrodes are connected to the thin film electrode layers. Namely, the thin film capacitor of the present embodiment applies the modifications of Embodiment 2 and Embodiment 3 to Embodiment 1. Other features are similar to Embodiment 1, and thus only the differences will be explained.

The thin film capacitor 400 of the present embodiment includes: a supporting substrate 410; a capacitance forming member 420 on the supporting substrate 410 and constituted by thin film electrode layers 421 and thin film dielectric layers 422 alternately stacked on one another; a protective layer 430 formed on top of the capacitance forming member 420 for protecting the uppermost thin film electrode layer 421; a pair of intermediate electrodes 440 electrically connected to the thin film electrode layers 421; a sealing member 450 that seals the capacitance forming member 420, protective layer 430, and intermediate electrodes 440; and a pair of external electrodes 460 that each electrically connect to the corresponding intermediate electrode 440.

The thin film capacitor 400 of the present embodiment differs from Embodiment 1 in that the thin film electrode layers 421 and intermediate electrodes 440 connect on the sides of the capacitance forming member 420. Accordingly, unlike in Embodiment 1, there are no depressions formed in the multilayer structure constituted by the capacitance forming member 420 and the protective layer 430.

The thin film capacitor 400 of the present embodiment differs from Embodiment 1 in that the intermediate electrodes 440 are only exposed to the sides of the sealing member 450 and connect with the external electrodes 460 at the sides of the sealing member 450. The external electrodes 460 are formed from the sides of the sealing member 450 to a portion of the top and bottom abutting these sides. Any method or material can be used to form the external electrodes 460. In a similar manner to a conventional MLCC, for example, a dip method or the like is used to coat a conductive paste onto the sides of the sealing member 450, and then the member is baked at a prescribed temperature and Cu, Ni, Sn, or the like is thin coated on the surface, thereby forming the external electrodes 460. Another method is to use sputtering, electron beam evaporation, thin coating, or the like of several types of materials such as Ti/Cu/Ni/Sn, for example.

The method of manufacturing the thin film capacitor 400 of the present embodiment may be a combination of the methods of manufacturing Embodiments 2 and 3 described above. The thin film capacitor 400 of the present embodiment can obtain similar effects to Embodiment 1.

Embodiment 5

Figure 9:
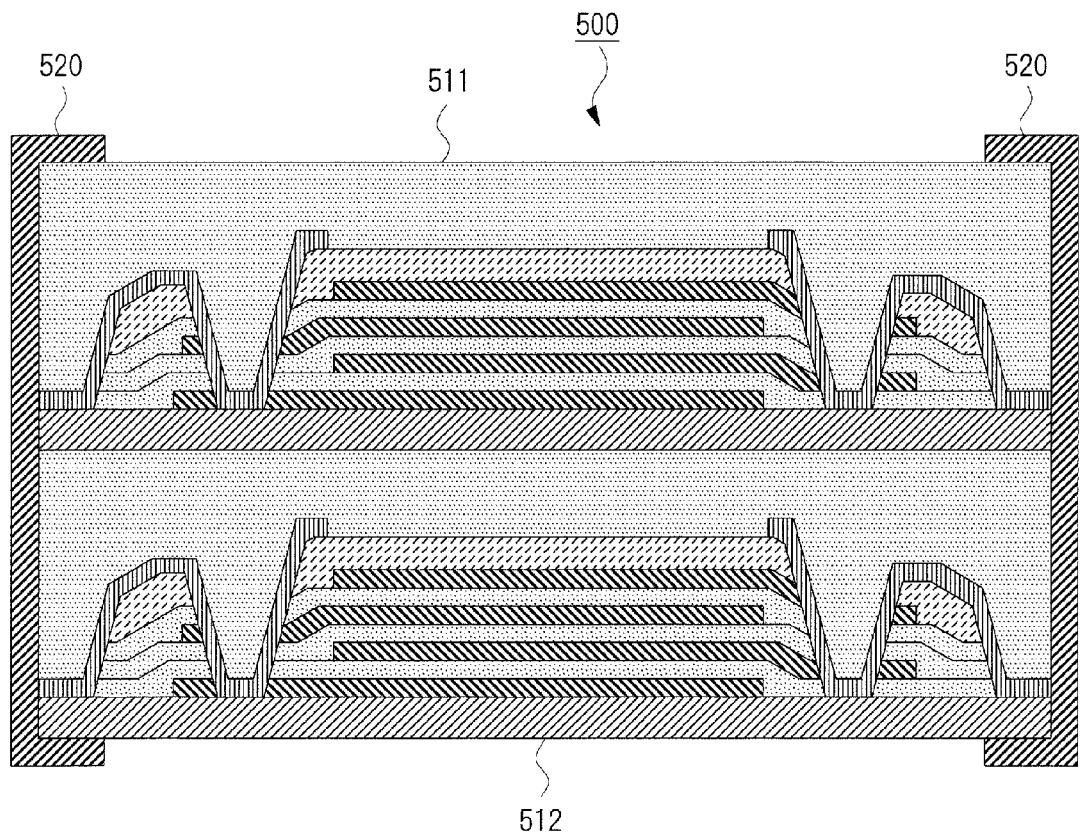
FIG. 9 is a cross-sectional view of a thin film capacitor of Embodiment 5.
Figure 10:
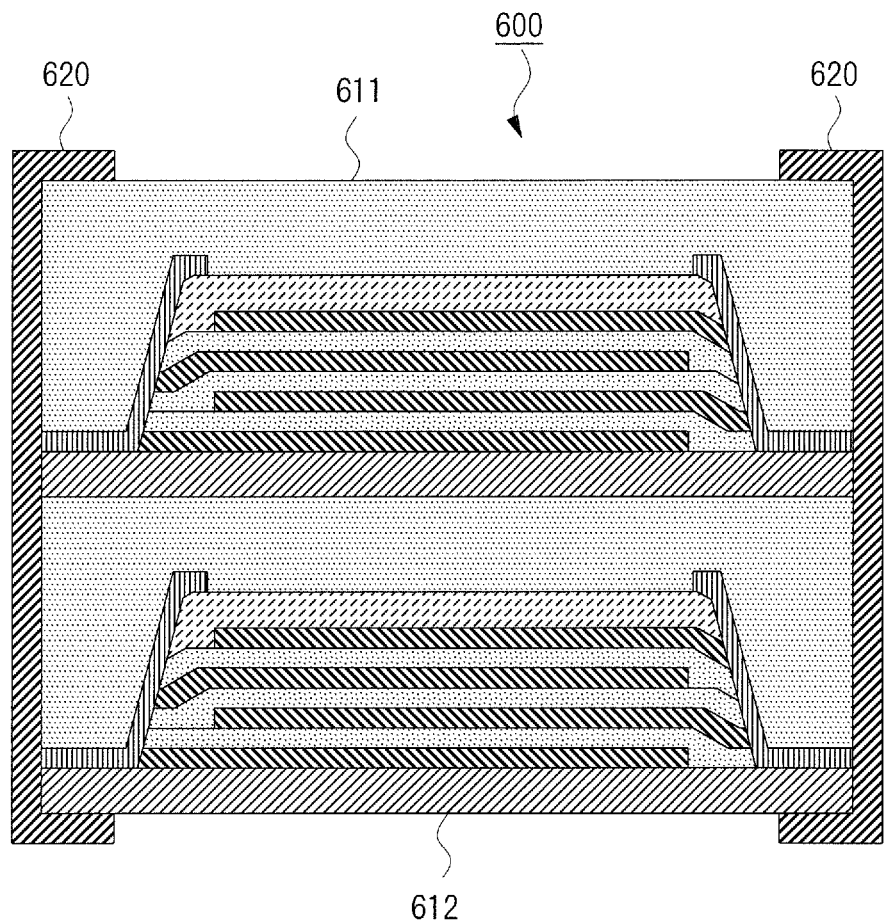
FIG. 10 is a cross-sectional view of a thin film capacitor in another example of Embodiment 5.

A thin film capacitor according to Embodiment 5 of the present invention will be explained with reference to FIGS. 9 and 10. FIGS. 9 and 10 are cross-sectional views of the thin film capacitor of Embodiment 5.

As shown in FIG. 9, a thin film capacitor 500 of the present embodiment has a plurality (two in FIG. 9) of multilayer structures 511 and 512 stacked in the thickness direction, which are the thin film capacitors of Embodiment 2 excluding the external electrodes. The external electrodes 520 connect to the intermediate electrodes, which are exposed to the sides of the multilayer structures 511 and 512, or namely, the sides of the sealing members of the multilayer structures 511 and 512.

As shown in FIG. 10, a thin film capacitor 600, which is another example of the present embodiment, is a plurality (two in FIG. 10) of multilayer structures 611 and 612 stacked in the thickness direction, which are the thin film capacitors of Embodiment 4 excluding the external electrodes. The external electrodes 620 connect to the intermediate electrodes, which are exposed to the sides of the multilayer structures 611 and 612, or namely, the sides of the sealing members of the multilayer structures 611 and 612.

In at least one aspect of the present invention, patterning of the thin film electrode layer is performed while the thin film electrode layers and thin film dielectric layers are stacked on one another, which makes the thickness of the capacitance forming member uneven. Thus, there is a limit to the number of layers due to internal stress and the like in the capacitance forming member. On the other hand, in the present embodiment, a plurality of multilayer structures are stacked on one another while sealed by the sealing member, thus making it possible to maintain a high degree of reliability while increasing capacitance.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A thin film capacitor, comprising:
    a supporting substrate;
    a capacitance forming member formed on the supporting substrate and made of at least two thin film electrodes and at least one thin film dielectric alternately stacked on one another, the capacitance forming member having a generally block shape, and having generally vertical walls on respective sides thereof, exposing respective one of lateral end edges of the thin film electrodes;
    intermediate electrodes respectively connected to the respective thin film electrodes by electrically and directly contacting the respective one of the lateral end edges of the thin film electrodes exposed at the generally vertical walls of the capacitance forming member, lateral end portions of the intermediate electrode being disposed directly on the supporting substrate;
    wherein at least portions of the respective intermediate electrodes are formed on a top surface of the capacitance forming member, and
    wherein the intermediate electrodes are not formed on an area on the top surface of the capacitance forming member where the thin film electrodes overlap one another in a plan view;
    a sealing member that covers and seals the capacitance forming member and the intermediate electrodes on the supporting substrate, the sealing member exposing portions of the lateral end portions of the intermediate electrodes that are directly on the supporting substrate; and
    external electrodes formed on at least side faces of the sealing member and respectively connected to the exposed portions of the lateral end portions of the intermediate electrodes.

2. The thin film capacitor according to claim 1,
    wherein the capacitance forming member has depressions formed on respective sides thereof, an inner side of each depressions being defined by said generally vertical wall, exposing said respective one of the lateral end edges of the thin film electrodes, and
    wherein the intermediate electrodes are formed inside the depressions, respectively, to make electrical connections with said exposed respective one of the lateral end edges of the thin film electrodes.

3. The thin film capacitor according to claim 2,
    wherein the sealing member is formed so as to expose lateral end edges of the lateral end portions of the respective intermediate electrodes, and wherein the external electrodes are electrically connected to the exposed lateral end edges of the respective intermediate electrodes.

4. A thin film capacitor module, comprising a plurality of the thin film capacitor as set forth in claim 3 stacked on one another,
wherein the external electrodes of the plurality of the thin film capacitor as set forth in claim 3 are integrated to provide respective unitary external electrodes.

5. The thin film capacitor according to claim 2,
wherein the sealing member that covers the intermediate electrodes is formed so as to expose portions of top surfaces of the lateral end portions of the respective intermediate electrodes that are directly on the supporting substrate, and
wherein the external electrodes are electrically connected to the exposed portions of the top surfaces of the respective intermediate electrodes on the supporting substrate.

6. The thin film capacitor according to claim 1, wherein said generally vertical walls of the capacitance forming member are respective side walls of the capacitance forming member.

7. The thin film capacitor according to claim 6,
wherein the sealing member is formed so as to expose lateral end edges of the lateral end portions of the respective intermediate electrodes, and
wherein the external electrodes are electrically connected to the exposed lateral end edges of the respective intermediate electrodes.

8. A thin film capacitor module, comprising a plurality of the thin film capacitor as set forth in claim 7 stacked on one another,
wherein the external electrodes of the plurality of the thin film capacitor as set forth in claim 7 are integrated to provide respective unitary external electrodes.

9. The thin film capacitor according to claim 6,
wherein the sealing member that covers the intermediate electrodes is formed so as to expose portions of top surfaces of the lateral end portions of the respective intermediate electrodes that are directly on the supporting substrate, and
wherein the external electrodes are electrically connected to the exposed portions of the top surfaces of the respective intermediate electrodes on the supporting substrate.

* * * * *